(12) United States Patent
Gemmel et al.

(10) Patent No.: US 9,064,619 B2
(45) Date of Patent: Jun. 23, 2015

(54) ELECTRICAL CABLE WITH EASILY REMOVABLE CASING

(71) Applicant: NEXANS, Paris (FR)

(72) Inventors: Alfred Gemmel, Klachreuth (DE); Christian Lankes, Feucht (DE); Alfred Mehl, Georgensmund (DE)

(73) Assignee: NEXANS, Paris (FR)

( * ) Notice: Subject to any disclaimer, the term of this patent is extended or adjusted under 35 U.S.C. 154(b) by 284 days.

(21) Appl. No.: 13/632,456

(22) Filed: Oct. 1, 2012

(65) Prior Publication Data

US 2013/0264094 A1    Oct. 10, 2013

(30) Foreign Application Priority Data

Oct. 20, 2011    (EP) .................................... 11290486

(51) Int. Cl.

| | |
|---|---|
| *H01B 3/30* | (2006.01) |
| *H01B 7/38* | (2006.01) |
| *H01B 13/14* | (2006.01) |
| *H01B 3/42* | (2006.01) |
| *H01B 3/44* | (2006.01) |
| *C08L 75/04* | (2006.01) |
| *H01B 3/28* | (2006.01) |
| *C08G 101/00* | (2006.01) |

(52) U.S. Cl.
CPC ................ *H01B 7/38* (2013.01); *H01B 13/141* (2013.01); *H01B 13/142* (2013.01); *H01B 3/421* (2013.01); *H01B 3/442* (2013.01); *C08L 75/04* (2013.01); *C08G 2101/00* (2013.01); *H01B 3/28* (2013.01); *H01B 3/441* (2013.01)

(58) Field of Classification Search
CPC .......... H01B 7/00; H01B 7/02; H01B 7/0208;
H01B 7/0216; H01B 7/0225; H01B 7/295;
H01B 7/0275; H01B 7/0283; H01B 7/17;
H01B 7/1855; H01B 7/28; H01B 7/366;
H01B 11/00; H01B 11/002; H01B 11/005;
H01B 11/02; H01B 11/04; H01B 11/06;
H01B 11/08; H01B 11/085; H01B 11/10;
H01B 11/1025; H01B 13/00
USPC ............ 174/110 R–110 PM, 120 R, 120 AR,
174/120 SR; 428/380, 383, 391
See application file for complete search history.

(56) References Cited

U.S. PATENT DOCUMENTS 5,162,609 A * 11/1992 Adriaenssens et al. .......... 174/34
5,358,786 A * 10/1994 Ishikawa et al. .............. 428/380
(Continued)

FOREIGN PATENT DOCUMENTS

| | | |
|---|---|---|
| DE | 2025026 | 12/1971 |
| DE | 2948651 | 6/1981 |

(Continued)

OTHER PUBLICATIONS

International Search Report dated Mar. 7, 2012.

*Primary Examiner* — William H Mayo, III
(74) *Attorney, Agent, or Firm* — Sofer & Haroun, LLP

(57) ABSTRACT

A cable which has at least two strands which each have a conductor surrounded by an insulation, where the strands are surrounded by an inner casing composed of a first polymer mixture and by an outer casing of a second polymer mixture resting on the inner casing, where the polymer components of the first and second polymer mixtures include a thermoplastic elastomer, and where the inner casing is foamed.

15 Claims, 1 Drawing Sheet

(56) References Cited

U.S. PATENT DOCUMENTS

| | | | |
|---|---|---|---|
| 5,360,944 A | 11/1994 | Springer et al. | |
| 5,521,009 A * | 5/1996 | Ishikawa et al. | 428/375 |
| 5,770,819 A * | 6/1998 | Mehan | 174/110 PM |
| 5,841,072 A * | 11/1998 | Gagnon | 174/110 F |
| 6,162,994 A * | 12/2000 | Durand et al. | 174/120 R |
| 6,222,129 B1 * | 4/2001 | Siekierka et al. | 174/113 R |
| 6,787,694 B1 * | 9/2004 | Vexler et al. | 174/27 |
| 7,015,398 B2 * | 3/2006 | Vexler et al. | 174/120 R |
| 7,696,437 B2 * | 4/2010 | Clark et al. | 174/110 R |
| 2002/0011346 A1 * | 1/2002 | Grogl et al. | 174/102 R |
| 2003/0121694 A1 | 7/2003 | Grogl et al. | |
| 2006/0246272 A1 * | 11/2006 | Zhang et al. | 428/304.4 |
| 2007/0135576 A1 * | 6/2007 | Ono | 525/192 |
| 2007/0149707 A1 * | 6/2007 | Nakata et al. | 525/192 |
| 2008/0283272 A1 | 11/2008 | Huston et al. | |
| 2010/0087584 A1 * | 4/2010 | Ono | 524/511 |

FOREIGN PATENT DOCUMENTS

| | | | |
|---|---|---|---|
| DE | 2948718 | 6/1981 | |
| DE | 10063926 | 7/2002 | |
| GB | 1313022 | 4/1973 | |
| GB | 1313022 A * | 4/1973 | C08G 22/44 |
| WO | 02082470 | 10/2002 | |
| WO | 2011054457 | 5/2011 | |
| WO | 2011073325 | 6/2011 | |

* cited by examiner

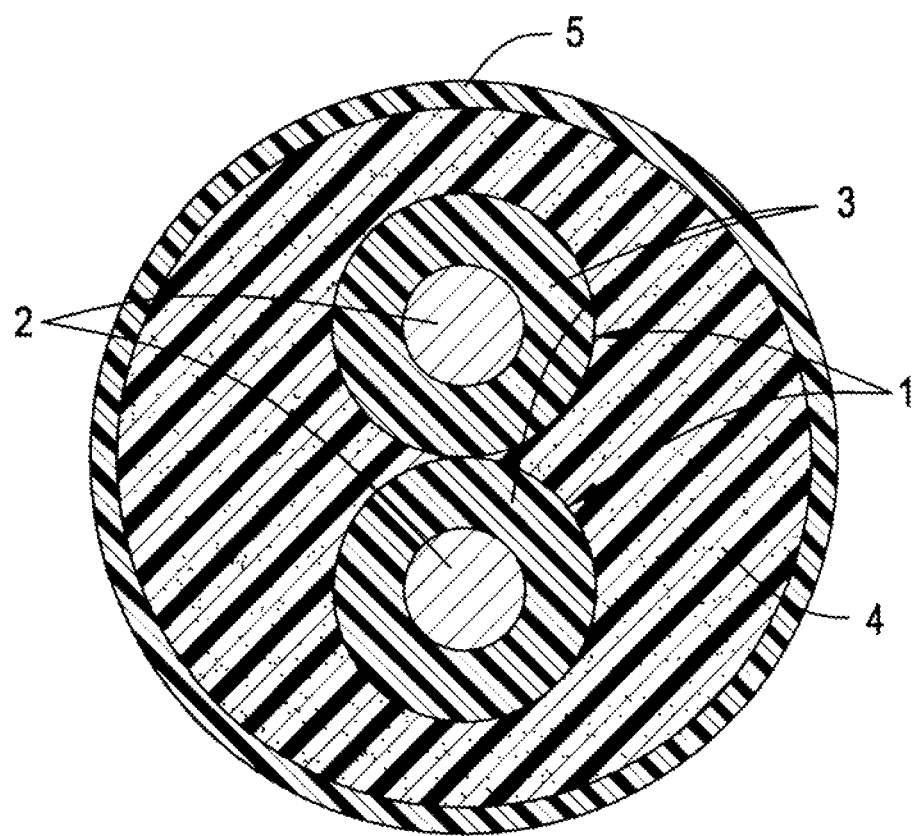

ELECTRICAL CABLE WITH EASILY REMOVABLE CASING

RELATED APPLICATIONS

This application claims priority to European Patent Application No. 11 290 486.7, filed on Oct. 20, 2011, the entirety of which is incorporated by reference.

BACKGROUND

1. Field of the Invention

The present invention relates to an electrical, cable which has, or consists of at least two strands, and an outer casing placed on the inner casing, as well as a manufacturing method for the cable according to the invention. The electrical cable according to the invention includes an inner and an outer casing which can be easily removed from the strands for removing the casing section by section.

In particular, the invention relates to cables in which the outer casing is placed directly on the inner casing without being integrally connected, or in which the outer casing is fixedly connected to the inner casing, preferably be a glued connection or an integral connection.

For preparing the cables for assembly, for example, the connection of contact elements to the electrical conductors, which form the strands together with insulation, it is required to completely remove the layers in one end section of the cable which surround the strands. Up to now it is necessary to completely radially sever the inner casing and the outer casing in order to be able to remove an adjacent section from the strands.

In the cable according to the invention, the inner casing and the outer casing each consist of a polymer mixture whose polymer component includes or consists of a thermoplastic elastomer. The thermoplastic elastomer is in particular thermoplastic polyurethane (TPU) which is, for example, a block copolymer in which soft segments of polyol with diisocyanate alternate with hard segments of diisocyanate with a short chain diol. Preferred thermoplastic polyurethane polymers are available under the name Ellastolan from the company ESAF.

2. Description of Related Art

It is known to manufacture cables with at least two strands and a casing of polyurethane surrounding the strands.

US 2008/0283272 A1 describes a cable whose strands are surrounded by foam which is compressed by an outer layer. A woven material of encased wire is used as the outer layer which generates the pressure acting on the foam.

DE 2025026 describes a cable around which is wound a web-like insulation material composed of a layer of polyurethane foam between two foils. A screening layer of aluminum strip is additionally placed on this winding and an outer casing of polyethylene is placed thereabove.

EP 1176613A2 describes a sample mixture for an inner casing of 50% polyether urethane as base material, 20% polyolefin, 29% calcium carbonate, and 1% propellant, on which is placed an outer layer. In this connection, the outer layer may be composed of the same base material as is also contained in the foamed mixture. However, the inner layer still has additives, which, in the example, are polyolefin and calcium carbonate.

OBJECTS AND SUMMARY OF THE INVENTION

It is the object of the invention to make available a cable and a method for the manufacture thereof, which is easier to prepare for assembly, particularly due to the fact that the casing can be removed from the strands when the casing is only incompletely radially severed.

The invention meets this object with the features of the Claims and particularly with a cable which has at least two strands, each of which has conductors surrounded by insulation, wherein the strands are surrounded by an inner casing composed of a first polymer mixture and an outer casing of a second polymer mixture resting on the inner casing, wherein the polymer components of the first and second polymer mixtures contain or consist of thermoplastic elastomer. In accordance with the invention, the inner casing is foamed, preferably with a pore content of 5% to 70% by volume, preferably 15% to 40% by volume more preferred with a pore content of 20% to 30% by volume while the outer casing is composed of the second polymer mixture and is solid or does not have a pore content. The inner casing may be placed directly on the strands, or, as an alternative, intermediate layers may be arranged between the strands and the inner casing.

Generally, cables according to the invention are produced by injection molding a first polymer mixture around at least two strands and, simultaneously or immediately subsequently, injection molding with a second polymer mixture, wherein subsequently the two polymer mixtures injection molded around the strands are hardened, particularly by cooling.

In the manufacturing method for the cable according to the invention, the first polymer mixture is injection molded around the strands, which are preferably stranded together, or, simultaneously or immediately subsequently, the second polymer mixture is injection molded so that the strands contact the first polymer mixture and, the first polymer mixture is arranged immediately adjacent the second polymer mixture. After the first polymer mixture and the second polymer mixture have been injection molded around the strands, the cable is cooled so that a hardened foamed inner casing of the first polymer mixture is produced with a hardened outer casing second polymer mixture which rests on or is particularly connected to, the first polymer mixture. The outer casing may be placed with positive engagement and without integral engagement, or preferably with integral engagement, on the foamed inner casing.

It has been found that particularly the preferred co-extrusion of the first and second polymer mixtures around the strands produces during the subsequent common hardening of the two polymer mixtures, a very tight composite connection, particularly an integral connection of the first polymer mixture with the second polymer mixture, so that in the cable according to the invention, the first polymer mixture forming the inner casing is connected integrally with the second polymer mixture which forms the outer casing of the cable and rests on the first polymer mixture. Due to the fact that the inner casing is composed of a foamed first polymer mixture on the basis of a thermoplastic elastomer, in comparison to the non-foamed inner casings, a weight reduction is obtained for the cable according to the invention, simultaneously with a high elasticity, which is due to the pore content of the inner casing.

The cable according to the invention, manufactured by the method according to the invention, has the particular advantage that, for removing the casing from the strands, it is sufficient to incompletely carry out radial separation, for example, by partially radially cutting the casing up to at most preferably into the area of the boundary layer between the inner and outer casings, together with the step of the subsequent removal of a casing section by moving the casing section parallel to the longitudinal axis of the cable. For removing a section of the casing from the cable according to the invention, it is sufficient to cut the outer casing completely radially and the inner casing remains because in the case of a tension load acting on the outer casing, the inner casing tears in the direction of the longitudinal axis of the cable and is removed together with the outer casing. For example, it is possible to sever from the casing consisting of inner and outer casings, only the portion of the outer casing in its cross sectional surface perpendicularly to the longitudinal axis of the cable so that, in the case of tensile loads acting on the cable casing in the longitudinal direction of the longitudinal axis of the cable, a removal of the casing section is possible only to the partial separation of the casing cross section. This is particularly advantageous in embodiments in which the outer casing is a thin layer placed on the inner casing, for example, with a layer thickness of about 0.05 mm to 20 mm, preferably 0.2 mm to 1.5 mm. Preferably, in the area of the cable from which the casing section has been removed, a connecting piece is mounted, for example, a plug, optionally after removal of the strand insulation.

The strands of the cable may have conventional insulations, for example, of a synthetic material mixture on the basis of PVC. Preferably, the strands are coated with a separating agent.

Generally, the cable may have at least two strands, an inner casing arranged around the two strands, and an outer casing surrounding the inner casing, optionally arranged between the strands and inner casing a foil and/or banding and/or a metal screen, particularly a woven metal fabric, or may consist thereof. In accordance with the invention, the casing consists preferably of an inner casing of a foamed first polymer mixture, and the outer casing placed on the inner casing of a second non-foamed polymer mixture, wherein this outer casing forms a homogeneous or sold layer on the foamed inner casing.

The cable having at least two strands which are surrounded by an inner casing of a first polymer mixture, on which rests an outer casing of a second polymer mixture, is characterized in that the first polymer mixture forming the inner casing is foamed and that the polymer component of the first polymer mixture contains a thermoplastic elastomer, or consists thereof. Preferably, the first polymer mixture of the inner casing is foamed to a pore content of 5% to 70% by volume. In accordance with a further preferred feature, the thermoplastic elastomer is selected from the group consisting of thermoplastic polyurethane, thermoplastic polyester polyether polymer, thermoplastic polystyrene elastomer, thermoplastic polyolefin elastomer, polystyrene block co-polymer and mixtures thereof, wherein the polymer content of the first polymer mixture contains particularly a polyolefin and/or ethylene propylene diene monomer rubber in mixture with the thermoplastic elastomer or consists thereof. The polystyrene block co-polymer may be one of a poly(styrene-ethylene-butylene-styrene) (SEBS), poly (styrene-butadiene-styrene) (SES), poly (styrene-isoprene-styrene) (SIS), poly (styrene-ethylene-propylene-styrene) (SEPS), poly(styrene-isobutylene-styrene) (SIS), and mixtures thereof. The polyolefin is preferred which is present in mixture with a thermoplastic elastomer, a crystalline homo-polymer or a crystalline static co-polymer. The thermoplastic elastomer, which is a mixture of the thermoplastic polymer with a polyolefin and/or an ethylene-propylene diene monomer rubber, may optionally be cross linked. Preferably, the inner casing rests directly on the strands. Optionally, a foil, a banding and/or a metal screen is arranged between the strands and the inner casing. Preferably, the first polymer mixture forming the inner casing is a composition with or of thermoplastic polymer and foaming agents. The second polymer mixture forming the outer casing preferably includes the components of the first polymer mixture, without their foaming agents, or consists thereof.

The method for manufacturing the cable by injection molding around at least two strands with a first polymer mixture and injection molding a second polymer mixture around the first polymer mixture, with subsequent hardening of the first and second polymer mixtures, is characterized in accordance with toe invention in that the polymer component of the first polymer mixture, which forms the inner casing, is thermoplastic elastomer, and that the first polymer mixture contains a foaming agent. Preferably, injection molding is effected by means of an extruder whose temperature is adjustable, so that the temperature of the first polymer mixture is adjusted to the disintegration temperature of the foaming agent. Preferably, an end portion of the casing is removed from the cable by severing the outer casing radially circumferentially, and an end portion of the casing adjacent the severed location is moved along the longitudinal axis of the cable. In this case, preferably only the outer casing is severed up to adjacent the inner casing, and particularly in that section in which the outer casing is removed with the inner casing by moving along the longitudinal axis of the cable, a connecting piece is mounted.

BRIEF DESCRIPTION OF THE DRAWINGS

The invention will now be described in more detail with the aid of examples and with reference to the FIGURE which schematically shows the configuration of the cable according to the invention in a cross sectional view.

DETAILED DESCRIPTION

Generally, the cable preferably includes a cylindrical outer circumference or a circular cross section as it corresponds to a conventional round cable, wherein in accordance with a further preferred feature, the outer casing has an essentially uniform layer thickness. In accordance with another further preferred embodiment, the outer casing is arranged with a small layer thickness on the inner casing, so that the outer casing has, for example, a layer thickness of 0.05 mm to 20 mm, more preferred 0.2 mm to 10 mm, more preferred 0.3 mm to 1.5 mm, or 0.8 mm to 1.0 mm.

The configuration of the cable according to the invention is schematically shown in the FIGURE in a two-strand cable. The strands 1 each consist of a conductor 2, which is particularly a stranded conductor, which is surrounded by insulation 3. The strands 1 are stranded to each other and surrounded by an inner casing 4 which rests on the strands 1, wherein the inner casing 4 preferably has a circular outer circumference. The inner casing 4 consists of a first polymer mixture which contains as bubbles and whose polymer component contains or consists of thermoplastic elastomer. An outer casing 5 with constant layer thickness is placed on the inner casing 4 which, therefore, has a circular ring-shaped cross section. The outer casing 5 consists of a second polymer mixture whose polymer component contains thermoplastic elastomer or consists thereof, wherein the outer casing 5 is free of gas inclusions.

The thermoplastic elastomer may be thermoplastic polyurethane, thermoplastic polyester polyether elastomer, thermoplastic polystyrene elastomer, thermoplastic polyolefin elastomer, a polystyrene block co-polymer, or a mixture of a thermoplastic elastomer, particularly a polystyrene block co-polymer, with a polyolefin and/or ethylene propylene diene monomer rubber (EPDN). Generally preferred is polystyrene block co-polymer of one of poly(styrene-ethylene-butylene-styrene) (SEAS), poly(styrene-butadiene-styrene) (SAS), poly (styrene-isoprene-styrene) (SIS), poly (styrene-ethylene-propylene-styrene)(SEPS), poly(styrene-isobutylene-styrene) (SIS), and mixtures thereof.

The thermoplastic elastomer may consist of at least one thermoplastic polyolefin containing an elastomer and/or at least one thermoplastic polyolefin containing a cross-linked elastomer. The polyolefin, which is present in mixture with a thermoplastic polymer, may be a crystalline homo-polymer or a crystalline static co-polymer, particularly of propylene and ethylene units and/or with $C_4$- to $C_{10}$- α-olefin units, particularly with 1-butene, 1-hexene, 4-methyl-1-pentene units. The α-olefin units may be unsaturated or saturated. The elastomer polyolefin may be an ethylene propylene rubber (EPR) optionally with diene-modification (EPDM).

The thermoplastic polymer preferably is thermoplastic polyurethane (TPU), for example, thermoplastic polyether urethane (polyether-TPU) and/or thermoplastic polyester urethane (polyester-TPU).

The thermoplastic polymer optionally consists of a co-polyester elastomer, a polyolefin elastomer, or mixtures thereof.

Thermoplastic polyester polymers comprise as thermoplastic polymers those with polyester and polyether segments and have, for example, hard segments of polybutylene terephthalate (PBT) and soft segments of polytetramethylene glycol (PTMG), hard segments of polybutylene terephthalate (PBT), and soft segments of polycaprolacton (PCL), or hard segments of polybutylene terephthalate (PBT) and soft segments of dimer fatty acids.

All of the above thermoplastic elastomers can be used in their pure form as polymers or as mixtures with various additives, such as, antioxidants, fillers, pigments, and other additives.

A preferred first polymer mixture, which of hardening forms the inner casing, has or consists of the following components:
   thermoplastic elastomers, for example, at 80-100 parts by weight, preferably polyurethane,
   foaming agent, for example, registered gaseous nitrogen or $CO_2$, preferably at least a chemical foaming agent which produces gas upon collapsing, for example, from the group which includes, carbonates, bicarbonates, hydrogen carbonates, carbamates of the alkaline metals, or earth alkaline metals or of aluminum, of transition metals, or of ammonia with an acid carrier, for example, a carbonic acid in mixture with Na-bicarbonate (available from Clarient as Hydrocerol BM 70) or citric acid (available from Clarient as Hydrocerol A).

The second polymer mixture, which forms the outer casing after hardening, may have a composition as it is indicated for the second polymer mixture, optionally the same composition, but without foaming agent.

Example 1

Manufacture of a Cable

In a conventional extrusion machine in which a first extruder feeds a first polymer mixture and a second extruder feeds the second polymer mixture to an extruder nozzle which included around a central duct in which the strands are guided, a first ring-shaped outlet opening and, surrounding the first outlet opening, a second ring-shaped outlet opening for the second polymer mixture, two stranded strands are injection molded together. Following the injection molding of the stranded strands with the first and second polymer mixtures, which occur essentially simultaneously, these polymer mixtures were hardened by cooling.

For the first polymer mixture Hydrocerol BM 70, alternatively Hydrocerol A was used as foaming agent. As the polymer mixture of the inner casing, TPU (Elastollan) plus 1% by weight Hydrocerol BM 70 were used. The second polymer mixture had the same composition for each cable as the first polymer mixture, however, without the foaming agent Hydrocerol.

The head of the extruder was heated to about 200° C. It was found that the processing temperature during the extrusion caused foaming of the first polymer mixture and hardening of the first and second polymer mixtures following their extrusion, so that a cable having a mechanically stable casing was produced.

The produced cable had a foamed inner casing with gas bubbles of about 20% to 30% by volume and a sold outer casing with a smooth surface resting on the inner casing. The cross section of the outer casing was ring-shaped and the inner casing filled out the portions between the strands up to the circular inner cross section of the outer casing.

Example 2

Removal of Casing from Cable

For the removal of a portion of the casing, a cable manufactured in accordance with Example 1 was radially cut at a distance of, for example, 1 cm to 2 cm from one end such that the outer casing was circumferentially severed up to adjacent the inner casing.

These tests have shown that, for removing the casing, it is sufficient to cut the outer casing radially circumferentially up to the layer thickness of the outer casing, particularly up to the boundary layer to the inner casing, in order to be able to pull the casing including the inner casing off the strands in the axial direction.

This example shows that the cable according to the invention offers the special advantage that, for removing the casing, it is only necessary to sever the outer casing radially circumferentially in order to pull an end portion of the casing, consisting of outer and inner casings, axially from the strands. This makes it unnecessary to completely radially sever the outer and inner casings, i.e. up to the strands, as it is necessary for removing the casing from cables which have a solid inner casing which is not foamed and an outer casing of polymer mixtures on the basis of polyurethane.

LIST OF REFERENCE NUMERALS

1 Strand
2 Conductor
3 Insulation
4 Inner casing
5 Outer casing

The invention claimed is:
1. Cable comprising:
   at least two strands, each of which has conductors surrounded by insulation, where the strands are surrounded by a foamed inner casing composed of a first polymer mixture and a non-foamed outer casing composed of a second polymer mixture, the outer casing resting on the inner casing, wherein
- the first polymer mixture contains gas bubbles and whose polymer component consists of a thermoplastic elastomer, and
- the second polymer mixture is free of gas inclusions and whose polymer component consists of the same thermoplastic elastomer as the first polymer mixture,
- wherein the thermoplastic elastomer is selected from the group consisting of thermoplastic polyurethane, thermoplastic polyester polyether polymer, thermoplastic polystyrene elastomer, thermoplastic polyolefin elastomer, polystyrene block co-polymer, and mixtures thereof.

2. Cable according to claim 1, wherein the first polymer mixture of the inner casing is foamed to a pore content of 5% to 70% by volume.

3. Cable according to claim 1, wherein the polystyrene block co-polymer is selected from the group consisting of poly(styrene-ethylene-butylene-styrene)(SEBS), poly(styrene-butadiene-styrene)(SBS), poly(styrene-isoprene-styrene)(SIS), poly(styrene-ethylene-propylene-styrene) (SEPS), poly(styrene-isobutylene-styrene) (SIS), and mixtures thereof.

4. Cable according to claim 1, wherein the inner casing rests directly on the strands.

5. Cable according to claim 1, wherein a foil, a banding or a metal screen is arranged between the strands and the inner casing.

6. Cable according to claim 2, wherein the polystyrene block co-polymer is selected from the group consisting of poly(styrene-ethylene-butylene-styrene)(SEBS), poly(styrene-butadiene-styrene)(SBS), poly(styrene-isoprene-styrene)(SIS), poly(styrene-ethylene-propylene-styrene) (SEPS), poly(styrene-isobutylene-styrene).

7. Cable according to claim 1, wherein the thermoplastic elastomer is thermoplastic polyurethane (TPU).

8. Cable according to claim 7, wherein the thermoplastic polyurethane is thermoplastic polyether urethane (polyether-TPU) and/or thermoplastic polyester urethane (polyester-TPU).

9. Cable according to claim 1, wherein the thermoplastic elastomer is used in its pure form as polymer.

10. Method for manufacturing a cable as claimed in claim 1, said method comprising the step of:
- injection molding around at least two strands with a first polymer mixture containing a foaming agent and whose polymer component consists of a thermoplastic elastomer, said first polymer mixture being able to form the foamed inner casing; and
- injection molding the first polymer mixture with a second polymer mixture whose polymer component consists of the same thermoplastic elastomer as the one in the first polymer mixture, said second polymer mixture being able to form the non-foamed outer casing
- with subsequent hardening of the first and second polymer mixtures,
- wherein the thermoplastic elastomer is selected from the group consisting of thermoplastic polyurethane, thermoplastic polyester polyether polymer, thermoplastic polystyrene elastomer, thermoplastic polyolefin elastomer, polystyrene block co-polymer, and mixtures thereof.

11. Method according to claim 10, wherein injection molding is effected by an extruder which is heated so that the first polymer mixture is heated to a temperature at which the foaming agent disintegrates.

12. Method according to claim 10, wherein an end section of the casing is removed from the cable by severing the outer casing radially circumferentially, and by moving an end section of the casing adjacent the severing location along the longitudinal axis of the cable.

13. Method according to claim 12, wherein only the outer casing is circumferentially cut up to the inner casing.

14. Method according to claim 13, wherein a connecting piece is mounted in that section in which the outer casing has been removed with the inner casing by moving along the longitudinal axis of the cable.

15. Method according to claim 12, wherein a connecting piece is mounted in that section in which the outer casing has been removed with the inner casing by moving along the longitudinal axis of the cable.

* * * * *